Feb. 26, 1952 M. ROY 2,587,227
MEANS FOR SUCKING IN THE BOUNDARY LAYERS ON THE
SURFACES OF REACTION JET FLYING MACHINES
Filed July 7, 1948 2 SHEETS—SHEET 1
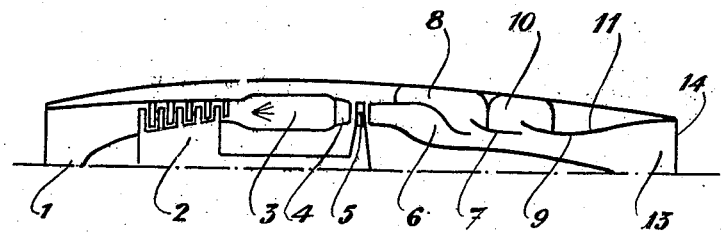
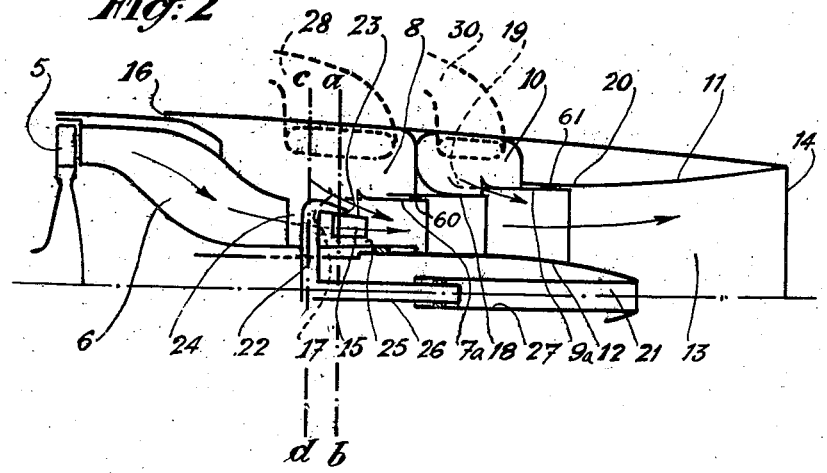
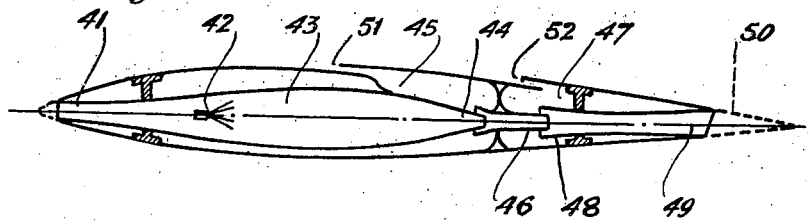
INVENTOR
Maurice Roy
By Watson, Cole, Grindle + Watson Patented Feb. 26, 1952

2,587,227

UNITED STATES PATENT OFFICE 2,587,227

MEANS FOR SUCKING IN THE BOUNDARY LAYERS ON THE SURFACES OF REACTION JET FLYING MACHINES

Maurice Roy, Paris, France, assignor to Societe Nationale d'Etude et de Construction de Moteurs d'Aviation, Paris, France, a company of France Application July 7, 1948, Serial No. 37,327
In France July 21, 1947

4 Claims. (Cl. 244—74)

On aircraft having a turbo jet unit, it has been proposed to take advantage of the presence of such a unit through which a large volume of air passes in operation, for sucking in the boundary layers on the wings, the tail fin or the fairing either for increasing the maximum lift during slow flight or else for reducing the resistance to friction during high speed flight. Among the methods proposed heretofore, I may mention in particular the method consisting in feeding the turbo jet unit with air sucked in from the boundary layer.

It is an object of my invention to provide improvements in means for sucking in boundary layers operated from aircraft jet units of any type.

The foregoing object is achieved by ejector means operated by the exhaust from aircraft jet units for producing suction; jet ejector means may be combined with any apparatuses providing a substantial jet reaction such as motor jet, turbo jet, compressorless jet, pulse jet devices and even reaction jet propellers adapted to transfer part of their useful power to a propeller. My invention is also applicable to a rocket type jet device, that is an arrangement that does not require for its operation any air fed from the outer atmosphere.

My invention purports to provide various advantages. Firstly, the efficiency of propulsion of the jet machine is improved through an increase of the total volume ejected and a reduction in the average speed of ejection thereof; where the efficiency of the mixing means in the exhaust ejector is sufficiently high, the total efficiency of the jet machine, that is the product of the thermic efficiency of the machine by its efficiency of propulsion, may in its turn be improved with a beneficial effect on the lift and on the fuel consumption.

The invention may be of particular interest, in the case of compressorless jet propulsion devices when the speed of flight is not very high, by reason of the low value, under such conditions, of their own propelling efficiency.

Moreover my device is deemed to provide a greater flexibility in the application of means for sucking boundary layers as suction is independent of the feed of the jet engine which remains provided in the normal manner and such feed may be adjusted through a mere variation of the relative outputs of the reaction jet and of the air from boundary layers. This adjustment may be operated as in the case of all ejectors by merely controlling the input cross section for air from the boundary layers, entering the mixing section of the ejector, that is the pipes or nozzles kept at a low temperature and conveying said air to said mixing section.

The following description and accompanying drawings given out by way of mere exemplification and by no means in a binding sense will allow of ascertaining how my invention may be carried out into effect, the features appearing both in the drawing and in the specification forming obviously part of said invention.

In said drawings:

Fig. 1 is a diagrammatical axial cross section of one half of a turbo jet unit provided with the improvements according to my invention.

Fig. 2 shows on an enlarged scale a modification of Fig. 1 together with an auxiliary arrangement associated with the bullet of the jet nozzle.

Fig. 4 is a diagrammatic cross section showing the application of the invention to a compressorless jet unit.

Figure 3:
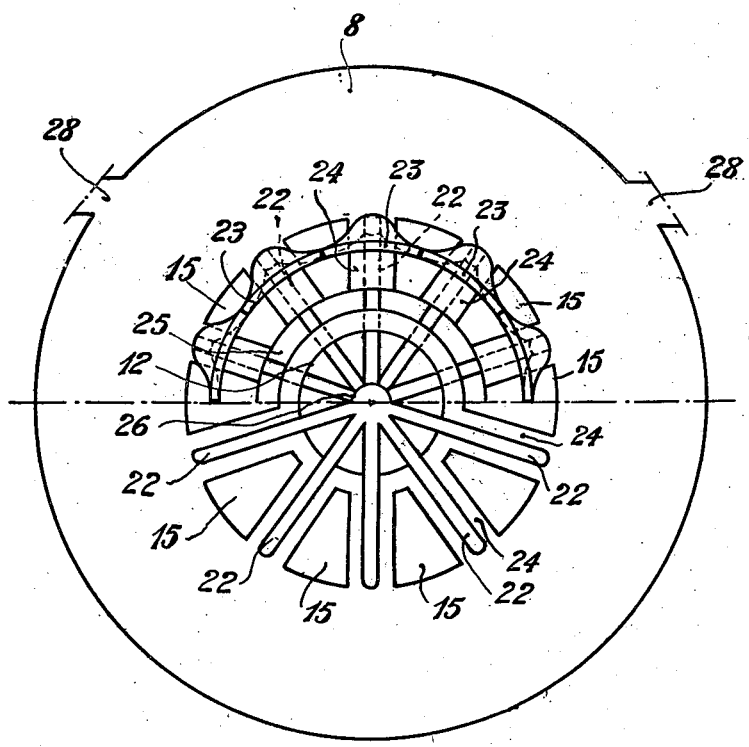
Fig. 3 is a cross section on a larger scale than Fig. 2 through line $ab$ of said figure for its upper part and through line $cd$ for its lower part.

In Fig. 1 is shown by way of example a turbo jet unit with a direct flow, comprising a front air intake 1, an axial compressor 2, combustion chambers 3 and gas turbines 4—5, driving the compressor. On the downstream side of the turbine wheel 5 is provided an ejection nozzle for gases as shown at 6, which nozzle is designed so as to form a two-stage ejector 7—9 sucking up air from two corresponding chambers or chests 8 and 10. Figs. 2 and 3 show furthermore on a larger scale various embodiments of the arrangements provided between the rotor 5 of the turbine and the output section 14 for the total jet.

The chambers or chests 8 and 10 correspond respectively to the two stages of the ejector; the number of stages may be higher than two or reduced to one as the case may be. Opening into said chambers or chests are sheaths or conduits 28 and 30 shown in dotted lines for the sake of simplicity and feeding air removed from the boundary layers at various points of the aircraft. The chamber 8 and/or the chamber 10 may also be fed partly from a slot such as 16 arranged at a suitable point on the fairing for the turbo jet unit.

In the example illustrated, the two-stage ejector comprises a stationary cylindrical section 18, a separate, rearwardly flaring section 11, an axially movable, cylindrical section $9a$ providing a passageway from section 18 to section 11, and another axially movable, cylindrical section 7a providing an inlet passageway to section 18; section 7a is supported for sliding axial movement on stationary section 18 and section 9a for sliding axial movement in the inner, cylindrical portion of section 11, so that sections 7a and 9a can be shifted forwardly to the positions shown in dash and dot lines at 17 and 19, respectively. Any known means, such as maze joints, or graphite rings or other packing rings may be used for providing a satisfactory fluidtightness between said cylindrical sliding parts, as diagrammatically illustrated at 60, 61, (Fig. 2).

Hollow arms having an aerofoil cross-section such as 24 are arranged radially around the axis of the turbo jet unit so as to allow a part of the air from the chamber 8 to be brought through the annular slot 25 around the central bullet 12 of the jet nozzle and flow rearwardly along the same; this jet of air is entrained by the driving jet of burnt gas produced in combustion chambers then passed via the wheel of turbine 5 to the front section 6 of the jet nozzle where expansion thereof takes place. Said jet of air provides for cooling of the outer surface of bullet 12 by bringing into contact therewith comparatively fresh air that forms an inner sheath for the driving jet and thus said air brought from boundary layers outside the jet unit via chamber 8 is caused to be spread over a wide surface for contact with the burnt gas jet that must entrain it. Moreover, in order to increase the efficiency of the terminal diffusor 13 without giving it an exaggerated length, it is possible to control the boundary layer around bullet 12 by causing the same to be sucked through an axial passage 21 extending frontwardly from the rear end of said bullet. In the embodiment illustrated, said passage is connected with radial tubes 22 formed inside the arms 24 through a rearwardly extending, intermediate tube 26 telescoped into tube 27 the bore of which provides the first-named passage 21; each tube 22 opens rearwardly with a flattened exit section at 23 into the stream of air driven rearwardly from chamber 8 by and around the gas stream issuing from nozzles 15.

The cross section shown in Fig. 3 illustrates the various openings 23 for the channels 22 that are flattened after the manner of a fish tail and located next to one another so as to form through their assembly a sort of annular opening.

The bullet 12 may be movable so as to allow a fine adjustment for certain conditions of operation. Any known or suitable means may be used for providing the required sliding movements and for ensuring fluidtightness between the sliding parts such as 26 and 27 of the bullet.

The mixing zones in the sections of the ejector are necessarily under a reduced pressure with reference to a calm atmosphere, as the pressure in the chambers such as 8 and 10 is less at the control points for the boundary layer, that are themselves under a reduced pressure, whereby the expansion on the downstream side of the turbine inside the nozzle 15 is increased. Consequently the ejector operates to provide a slight recompression of the gases passed therethrough as is required for ejection of said gases at 14, such recompression taking place in diffuser 11.

Fig. 4 shows the application of the exhaust ejector adapted to suck in the boundary layer, to the case of a compressorless jet unit housed inside a wing. The outer surface of this wing that is designed for high speeds is formed with a front opening in order to feed through a diffusor 41 a combustion chamber 43 into which fuel is injected at 42. A flattened nozzle 44 feeds a primary jet into a simple or compound ejector, in the present case a two stage ejector 46—48 receiving boundary layer air from chambers 45 and 47, into which open two suction slots 51 and 52 provided on the upper surface of the wing. A diffusor 49 that is flat like the ejector sections 46 and 48 exhausts the total jet through the rear end 50 of the wing that is truncated. The suction of the boundary layer that is more particularly of interest for high speeds is associated in the present case to advantage with the use of a compressorless jet unit, the propelling efficiency of which may be considerably improved through the supplementary dilution ensured by the exhaust ejector.

The light weight characterizing the compressorless jet unit allows an easy incorporation thereof inside the wings under the form of a battery of spaced apparatuses associated with a plurality of slots distributed along the span and the depth of the wing.

The lateral divergence given to the ejectors and to the outlet slots of the compressorless jet units allows, with a single combustion chamber, of occupying an extensive portion of the wing and reducing the height of the truncated rear of the trailing end.

What I claim is:

1. In an aircraft comprising air-exposed surfaces and a hollow nacelle having a rear aperture and a front jet production unit provided with a generally annular rear discharge exit supported within said nacelle, the combination of plurality of successive telescoped tubular sections arranged axially at the rear of said discharge exit to leave an air annular chamber between said sections and the inner wall of said nacelle, two adjacent sections out of said sections having peripheral clearance therebetween to place said annular chamber in open communication with the inner space of said sections, and the rearmost section being diverging to said rear aperture in said nacelle, axially arranged means extending rearwardly of said annular rear discharge aperture through said sections, having an axially adjustable position, to provide a central obstruction of variable axial extent within said sections, and air conveying means for bringing air to said annular chamber from a boundary layer control point on one of said air-exposed surfaces.

2. The combination of claim 1, at least one of said tubular sections being axially movable for adjustment purposes.

3. The combination of claim 1, said central obstruction means being hollow and having an orifice at the rear end thereof, the combination further comprising tubular means for placing the inside of said central obstruction in communication with a suction point downstream with respect to said rear discharge exit from said jet production unit, so as to control the boundary layer around said central obstruction means at said rear end thereof.

4. In an aircraft comprising air-exposed surfaces and a hollow nacelle having a rear aperture and a front jet production unit provided with a generally annular rear discharge exit supported within said nacelle, the combination of a central guide member supported within and from said nacelle in axial position, extending rearwardly of said rear discharge exit, a flow control member extending rearwardly of said central guide member slidably supported therefrom for axial movement and having a tapering rear end, a series of successive fore-aft tubular sections of rearwardly increasing diameters larger than that of said rear discharge exit and smaller than that of said nacelle, supported within and from the same to leave an annular chamber therebetween, the rearmost tubular section being generally flaring rearwardly to said rear aperture of said nacelle, while the other sections are generally cylindrical, and peripheral clearance being left between two adjacent sections in said series for open communication with said annular chamber, and air conveying means for bringing air to said annular chamber from a boundary layer control point on one of said air-exposed surfaces.

MAURICE ROY.

REFERENCES CITED

The following references are of record in the file of this patent:

UNITED STATES PATENTS

| Number | Name | Date |
|---|---|---|
| 2,085,761 | Lysholm | July 6, 1937 |
| 2,346,178 | Mercier | Apr. 11, 1944 |
| 2,348,253 | Griswold | May 9, 1944 |
| 2,383,385 | Heintze | Aug. 21, 1945 |
| 2,390,161 | Mercier | Dec. 4, 1945 |
| 2,453,721 | Mercier | Nov. 16, 1948 |

OTHER REFERENCES

"Aviation" issue of Nov. 1945, page 130.